(12) United States Patent
Adams et al.

(10) Patent No.: US 9,565,520 B1
(45) Date of Patent: *Feb. 7, 2017

(54) SYSTEM AND METHOD FOR LOCATION-BASED TARGETED NOTIFICATIONS USING WIRELESS COMMUNICATION DEVICES

(71) Applicant: West Corporation, Omaha, NE (US)

(72) Inventors: Steven D. Adams, Superior, CO (US); Stephen John Ciesielski, Omaha, NE (US); Ashish Patel, Westminster, CO (US); Michelle L. Steinbeck, Omaha, NE (US); James C. Creigh, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,972

(22) Filed: Jun. 1, 2015

Related U.S. Application Data

(63) Continuation of application No. 11/863,436, filed on Sep. 28, 2007, now Pat. No. 9,049,542.

(51) Int. Cl.
*H04W 24/00* (2009.01)
*H04W 4/02* (2009.01)
*H04W 64/00* (2009.01)
*H04W 4/12* (2009.01)

(52) U.S. Cl.
CPC ............... *H04W 4/02* (2013.01); *H04W 4/12* (2013.01); *H04W 64/00* (2013.01)

(58) Field of Classification Search
CPC ... H04W 48/04; H04W 64/00; H04M 1/72569
USPC .............. 455/411, 456.3, 456.1, 456.2, 440, 13.1,455/13.4; 345/633; 370/252
See application file for complete search history.

(56) References Cited

U.S. PATENT DOCUMENTS

2004/0259540 A1* 12/2004 Banerjee ................. H04W 4/16
455/425
2005/0066044 A1* 3/2005 Chaskar ................ G01S 5/0205
709/230

* cited by examiner

*Primary Examiner* — Kiet Doan
(74) *Attorney, Agent, or Firm* — Raffi Gostanian

(57) ABSTRACT

A system, method and computer readable medium for targeting messages delivered by wireless communication comprising determining at least one target space within at least one wireless communications network, determining a notification list comprising at least one recipient in said at least one target space, determining at least one notification message, and transmitting said at least one notification message through said at least one wireless communications network to at least one recipient on said notification list.

22 Claims, 5 Drawing Sheets

SYSTEM AND METHOD FOR LOCATION-BASED TARGETED NOTIFICATIONS USING WIRELESS COMMUNICATION DEVICES

CROSS-REFERENCE TO RELATED APPLICATIONS

This application is a continuation from U.S. patent application Ser. No. 11/863,436, filed Sep. 28, 2007, entitled "SYSTEM AND METHOD FOR LOCATION-BASED TARGETED NOTIFICATIONS USING WIRELESS COMMUNICATION DEVICES", the entire contents of which is incorporated by reference herein in its entirety.

FIELD OF THE INVENTION

This invention relates to a system and method for providing targeted notifications and in particular to providing targeted notifications to users of wireless communications devices.

BACKGROUND OF THE INVENTION

Wireless communications devices have become a preferred communications device for many users. A wireless communications device allows a user to be in communication with relevant information sources regardless of the recipient's location. Methods and systems exist for allowing a recipient to subscribe to a notification service to receive desired information such as sporting scores, stock market reports and the like. These notifications are broadcast to all subscribed recipients without the notification being targeted specifically to the recipient.

SUMMARY OF THE INVENTION

The present invention provides enhancements to existing notification services by supporting notifications targeted to specific recipients, in particular by targeting notifications to recipients within an area.

In one embodiment of the disclosure, a method for targeting messages delivered by wireless communication comprises determining at least one target space within at least one wireless communications network; determining a notification list comprising at least one recipient in the target space; determining at least one notification message; and transmitting at least one generated notification message through the at least one wireless communications network to at least one recipient on the notification list.

In one embodiment of the disclosure, a wireless communications system comprises at least one wireless communications network; at least one mobile station registered on the wireless communications network; at least one processor; and at least one memory; wherein the memory stores at least one target space; wherein the processor is adapted to determine at least one mobile station serviced by the wireless communications network within the target space; and wherein the processor is adapted to cause transmission of at least one notification message to the at least one mobile station within the at least one target space through the at least one wireless communications network.

In one embodiment of the disclosure, a computer readable medium comprises instructions executable on at least one processor for receiving a definition of a target space; determining a list of mobile stations within the defined target space; and causing at least one wireless communications network to provide at least one notification message to at least one of said mobile stations in said list of mobile stations.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
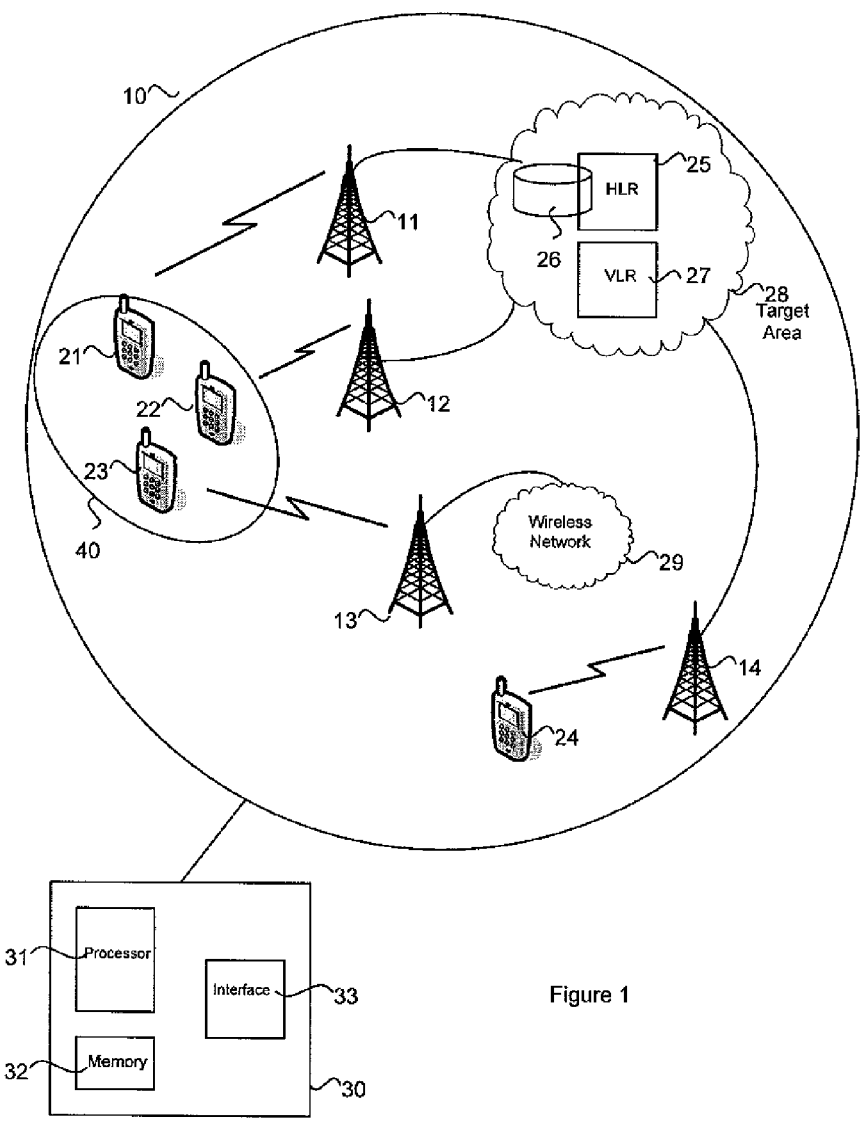
FIG. 1 represents a wireless communications system.

With reference to FIG. 1, there is shown a network space 10 serviced by a plurality of serving stations 11, 12, 13, 14. Each serving station is associated with a wireless communications network and is capable of serving mobile stations 21, 22, 23, 24 within the network space 10. As is known in the art, a wireless communications network, for example network 28, has a Home Location Register (HLR) 25 with database 26. As is well known, the HLR 25 stores registration information, via database 26, for each mobile station registered to the network, the registration information including a current or last known location for the mobile station. Other components common to wireless networks are omitted for clarity.

In the illustration of FIG. 1, serving stations 11, 12, 14 each correspond to associated wireless network 28 while serving station 13 is associated with wireless network 29.

In accordance with an embodiment of the invention, there is provided a computer system 30 having at least one processor 31 and at least one memory 32 storing an instruction set that is executable on the processor 31. The computer system is in communication with the wireless networks 28, 29 through any suitable communications interface. The computer system 30 includes an interface 33 for controlling the processor as will be described below.

Figure 2:
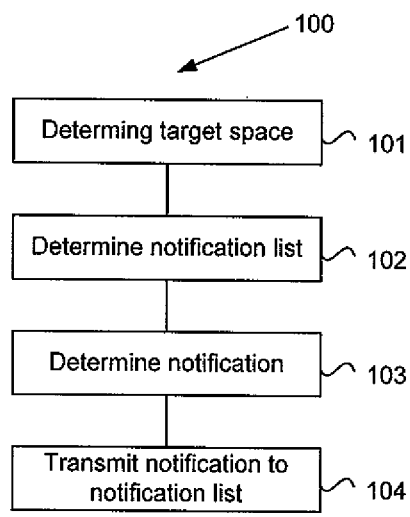
FIG. 2 is a flowchart representing a targeted notification process.

A method for providing targeted notification in accordance with an embodiment of the invention will now be described with reference to FIG. 1 and to the flowchart 100 of FIG. 2.

At step 101, a target space 40 is determined within the network space 10. The target space may be determined by retrieving a pre-defined target space from the memory 32, or may be defined, for example, by a user inputting a target space such as a geographic region through the interface 33. At step 102, the processor determines a notification list being a list of intended recipients within the target space 40, ie mobile stations 21, 22, 23. At step 103, the processor determines a notification message to be sent to the recipient list. The notification message may be determined by retrieving a message from a message database, such as from memory 32 or from an external database as will be described in greater detail below. Alternatively, a user may enter a notification message through interface 33.

The processor 31 then pushes the notification message to each of the recipients in the notification list, ie mobile stations 21, 22, 23 (step 104) through the networks 28, 29, using known techniques.

Figure 3:
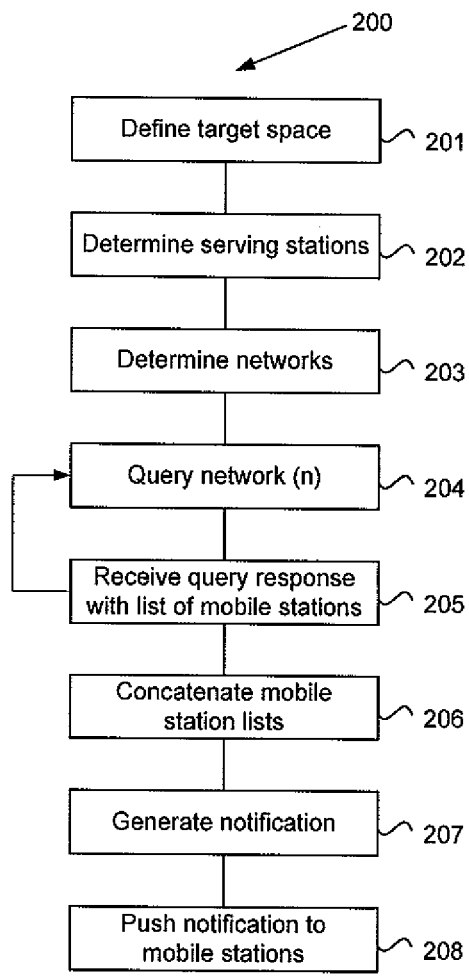
FIG. 3 is a flowchart representing a process for determining a notification list.

A process for determining the notification list will now be described with reference to FIG. 1 and to the flowchart 200 of FIG. 3.

A target space 40 has been defined at step 201, for example in a manner described above. At step 202, the processor 31 determines the stations 11, 12, 13 serving the target space 40. The serving stations may be determined using a map, stored in memory 32, that associates a list of serving stations with their respective coverage area. Alternatively, the target space may be defined as a list of serving stations such that the steps of defining the target space 40 and determining the serving stations 11, 12, 13 occur concurrently.

With the serving stations 11, 12, 13 known, the processor 31 then determines each of the networks 28, 29 associated with the serving stations (step 203). The processor then sequentially queries the networks 28, 29 to determine the mobile stations currently active in the target space. Selecting a first network 28, the processor 31 commences the query by providing a list of the relevant serving stations 11, 12 to the network 28 (step 204). The network runs its own internal query to the HLR 25 to determine the mobile stations that are currently being served by the serving stations 11, 12. For serving stations 11, 12, the current mobile stations are mobile stations 21, 22. The list of mobile stations is then received as a query response from the network 28 by the processor 31 (step 205). The processor 31 then repeats the query process for the network 29 in respect of serving station 13, and for each network providing serving stations to the target space 40.

No query is provided to a network in respect of mobile serving stations 24, as the initial processing determines that the mobile serving stations 24 do not service the target space 40.

Once all networks have been queried, the processor concatenates the list of mobile stations (step 206). The processor then generates a notification that is to be sent to the target space (step 207), for example in the manner described above. The notification may be generated as a preset notification stored in memory 32 or may be input by a user through the interface 33. Alternatively, the notification message may be generated by retrieving the notification message from a third party database as will be described in greater detail below.

The processor 31 then pushes the notification message to each of the recipients in the concatenated list, ie mobile stations 21, 22, 23 (step 208) using known techniques. Instead of providing a notification message to all mobile stations within the target space, the processor may further process the list of mobile stations to select only eligible recipients, such as those that have opted in to a notification service. A registration of recipients who have opted for a notification service may be stored in memory 32 and accessed to determine the eligible recipients.

Figure 4:
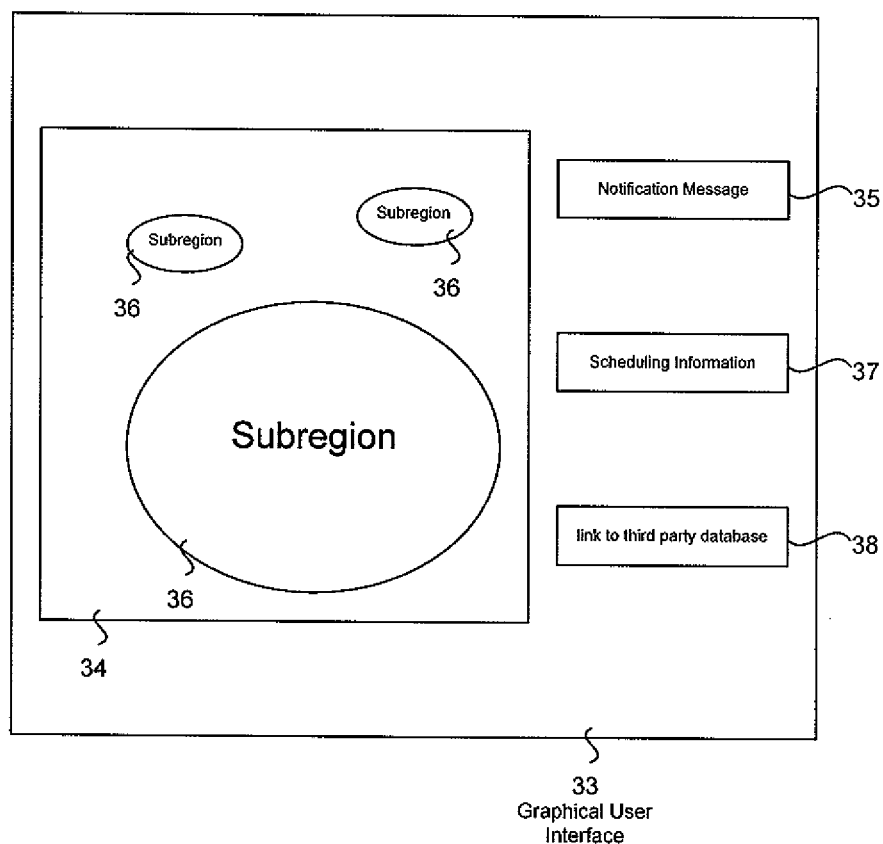
FIG. 4 represents an interface for providing notification data.

As described above, the computer system 30 provides an interface 33, for example through an internet interface, allowing authorized users to provide notification data into a notification record. An example of an interface 33 is shown as a graphic user interface in FIG. 4. In the graphic interface 33, a user is able to select a map 34 or one or more subregions 36 of a map. The user may also enter a notification message into the field 35. With this information entered, the processor 33 is able to process the region data and the notification message to then send the notification message to all mobile stations within the entered regions. The data may be entered at the time the notification is to be sent, or the notification may be scheduled, for example by entering scheduling information into field 37.

In one alternative, instead of providing a specific notification message 35, a user may provide a link 38 to a third party database where notification messages are stored. Such a system allows a third party user to update and maintain the notification messages, without being required to access the computer system 30.

In one embodiment, the processor executes a scheduling routine that controls the scheduling of notification messages in accordance with schedule information entered through the interface. The scheduling routine allows a user to enter a notification into the system once, with updates to notification messages being provided by means of a link to a notification message database. Each time the notification executes, the processor retrieves the most up to date notification message through the specified link.

Figure 5:
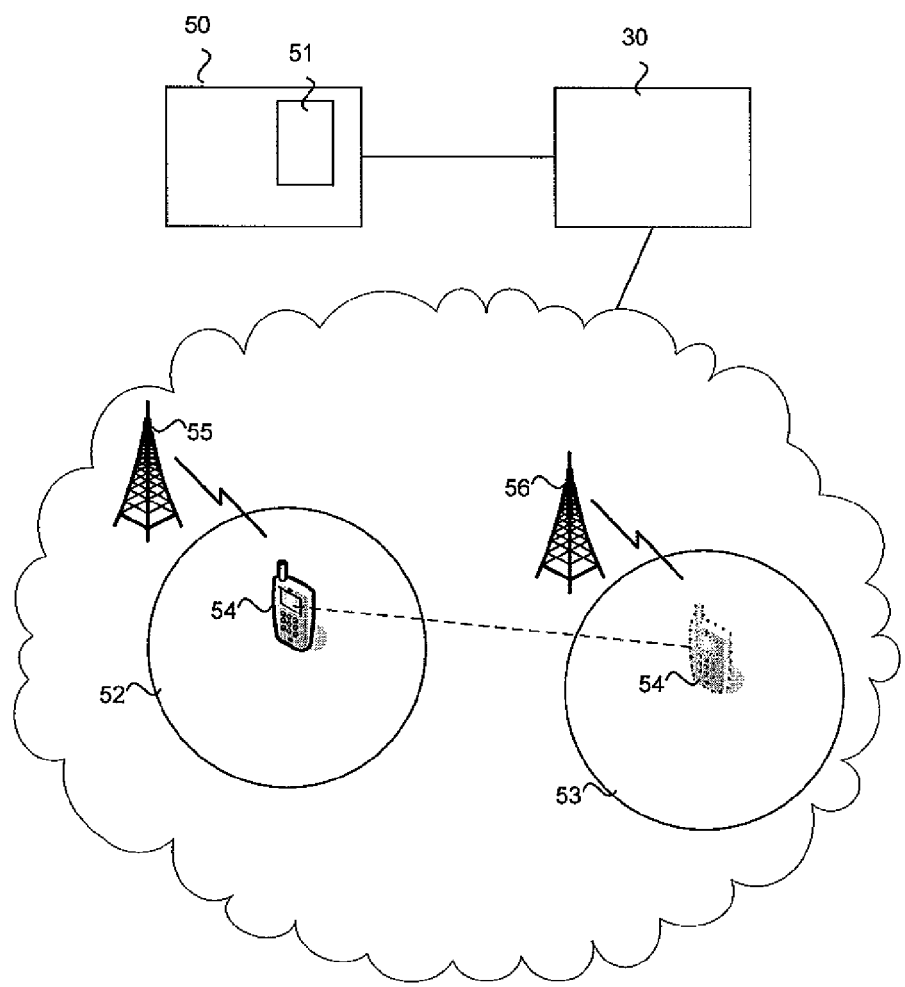
FIG. 5 represents a system for providing targeted notifications.

An example of a notification may be a geographic report, such as a traffic or weather report targeted to a specific area. In a traffic report example, illustrated in FIG. 5, a traffic management authority 50 schedules a traffic report notification through the computer system 30. The traffic report notification within computer system 30 provides a reference link to a database 51 which maintains up to date traffic information. The traffic management authority 50 may schedule the traffic reports for regular intervals, for example, hourly, through the computer system 30. The traffic reports can be targeted to specific areas, such as areas serviced by major roads, suburbs, or any suitably definable area. In the example shown, the traffic management authority schedules a first notification targeted to area 52 serviced by station 55 and a second notification targeted to area 53 serviced by station 56. A recipient 54 who has opted to receive a traffic update service will receive the hourly reports for as long as they are in a designated area. Initially, the recipient is in area 52 and so receives traffic reports targeted to area 52. As the recipient 54 journeys to area 53 (as shown in ghosted outline), the recipient 54 will receive traffic reports targeted to area 53. Thus, the recipient receives the traffic information most relevant to their location.

As well as regular reports, the traffic management authority may also provide urgent notifications by providing the information to the computer system 30 and scheduling the urgent notification for immediate transmission.

The ability to provide urgent notifications makes the invention suitable for providing emergency notifications targeted to regions in which the emergency is current. Emergency notifications may include storm warnings, flood warnings, terrorism warnings etc. For example recipients in one region of a storm affected area may be notified of a first evacuation route while recipients in a second area may be notified of a second evacuation route. Urgent notifications may also have a commercial nature, for example notification of sales and similar events.

The above described embodiments provide examples of pushing notification messages to recipients. That is, the timing of the notification is controlled from the message provider viewpoint, for example under the control of a notification scheduler. In an alternative embodiment, notification messages may be pulled from the system by the recipient. When a recipient, eg recipient 21 in FIG. 1 enters a target space 40, the HLR 25 will register that the recipient is within the target space. This registration may trigger the processor 31 to provide the recipient with a notification message pertaining to the target space 40. That is, a notification list is determined in response to a recipient entering the target space 40. The notification list may have a single record pertaining to the recipient 21 or may have additional records pertaining to other recipients who have recently entered the target space. With reference now to the traffic management embodiment of FIG. 5 described above, the recipient 54 may receive a traffic report as soon as the recipient enters region 52 and then receive a further traffic report as the recipient enters region 53. That is, the recipient does not rely on a notification schedule in order to receive notification messages but instead receives the notification messages as soon as is relevant, ie, immediately upon entering the respective target space.

The skilled addressee will readily understand that the invention relates to the methods and systems for providing targeted notifications, not the specific types of communications provided. Therefore, all manner of communications, including but not limited to voice, data, text message, VOIP, email, fax, multimedia etc and their equivalents are considered to be within the scope of the invention. Similarly, the present invention is considered to be independent of the type of mobile telecommunications device employed, with, for example, mobile telephones, pagers, personal digital assistants, WAP enabled devices etc being considered as equivalent and hereinafter referred to as mobile stations.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   retrieving at least one target space from a memory of at least one computing system within at least one wireless communications network;
   determining at least one mobile station is currently active in the at least one target space by sequential query of the at least one wireless communications network;
   determining at least one notification message from a database of at least one computing system; and
   transmitting said at least one notification message through said at least one wireless communications network via a processor pushing the at least one notification message to at least one recipient on a notification list.

2. The method according to claim 1 wherein said at least one notification message is transmitted to each recipient on said notification list.

3. The method according to claim 1 wherein determining said notification list comprises determining the recipients within said target space.

4. The method according to claim 3 further comprising determining the recipients within said target space that are eligible recipients.

5. The method according to claim 3 wherein determining the recipients within said target space comprises:
   determining one or more serving stations providing wireless communication service to said target space;
   determining at least one mobile station registered to a recipient receiving wireless communications service from said one or more serving stations.

6. The method according to claim 5 further comprising determining a wireless communications network associated with said one or more serving stations and executing a query to said wireless communications network to determine at least one mobile station receiving wireless communications service from said one or more serving stations.

7. The method according to claim 6 comprising executing said query to each wireless communications network providing wireless communications service to said target space.

8. The method according to claim 1 wherein determining said notification message comprises retrieving a notification message from a database.

9. The method according to claim 8 wherein retrieving a notification message from a database comprises accessing said database to retrieve a link to an external database and retrieving said notification message from said external database.

10. The method according to claim 1 wherein determining a notification message comprises receiving a message from a user through a user interface.

11. The method according to claim 3 wherein at least the steps of determining the recipients within said target space and transmitting at least one notification message to at least one recipient on said notification list are performed in accordance with a schedule.

12. The method according to claim 1 wherein determining said notification list is performed in response to a recipient entering said at least one target space.

13. A system, comprising:
   at least one wireless communications network;
   at least one processor; and
   at least one memory;
   wherein said memory stores at least one target space;
   wherein said processor determines the at least one mobile station is currently active in the at least one target space by sequential query of the at least one wireless communications network; and
   wherein said processor transmits the at least one notification message to said at least one mobile station within said at least one target space through said at least one wireless communications network.

14. The system of claim 13 wherein said at least one wireless communications network comprises at least one of a home location register and a visitor location register and wherein said processor queries at least one of said home location register and said visitor location register to determine at least one mobile station within said target space.

15. The system of claim 14 wherein said at least one wireless communications network comprises a plurality of serving stations, wherein said memory stores an association between at least one of said serving stations and said target space, and wherein said processor queries at least one of said home location register and said visitor location register by a provision to said wireless communication network with one or more of said serving stations associated with said target space.

16. The system of claim 13 wherein said memory stores at least one link to at least one external notification message database and wherein said processor retrieves at least one notification message from said at least one external notification message database.

17. A non-transitory computer readable medium comprising instructions executable on at least one processor for:
   receiving a definition of a target space via input through at least one interface;
   retrieving at least one target space from a memory;
   determining a list of mobile stations is currently active in the defined target space by sequential query of at least one wireless communications network; and
   causing at least one wireless communications network to provide the at least one notification message to at least one of said mobile stations in said list of mobile stations via the processor pushing the at least one notification message to at least one input of the at least one of said mobile stations in said list of mobile stations.

18. The non-transitory computer readable medium according to claim 17 further comprising instructions for determining one or more serving stations that provide wireless communications to said defined target space.

19. The non-transitory computer readable medium according to claim 18 further comprising instructions for retrieving from a memory an association between a plurality of serving stations and an area serviced by said plurality of serving stations and processing said association to determine one or more serving stations that service said defined target space.

20. The non-transitory computer readable medium according to claim 17 further comprising instructions for providing an interface and for receiving at least one of a notification message and a link to a notification message through said interface.

21. The non-transitory computer readable medium according to claim 17 further comprising instructions for providing an interface and receiving a notification schedule through said interface.

22. The non-transitory computer readable medium according to claim 21 further comprising instructions for causing at least one wireless communications network to provide at least one notification message to at least one of said mobile stations in said list of mobile stations in accordance with a schedule received through said interface.

* * * * *